(12) United States Patent
Smith et al.

(10) Patent No.: US 6,648,511 B2
(45) Date of Patent: Nov. 18, 2003

(54) ELECTRIC MOTOR BEARING SYSTEM AND JOURNAL

(75) Inventors: Michael D. Smith, Jefferson City, MO (US); Rickey W. Jennings, Ozark, MO (US); Jack D. Rinehart, Stover, MO (US); William A. Ziegler, Jefferson City, MO (US)

(73) Assignee: Fasco Industries, Inc., Ozark, MO (US)

( * ) Notice: Subject to any disclaimer, the term of this patent is extended or adjusted under 35 U.S.C. 154(b) by 0 days.

(21) Appl. No.: 09/899,311

(22) Filed: Jul. 5, 2001

(65) Prior Publication Data

US 2002/0003911 A1 Jan. 10, 2002

Related U.S. Application Data

(60) Provisional application No. 60/217,164, filed on Jul. 10, 2000.

(51) Int. Cl.$^7$ ................................. F16C 23/04
(52) U.S. Cl. ........................ 384/209; 384/210
(58) Field of Search ................... 384/209, 210, 384/537, 207, 206

(56) References Cited

U.S. PATENT DOCUMENTS 4,777,395 A * 10/1988 Taylor et al. ............... 384/209
5,326,178 A * 7/1994 Strobl ......................... 384/210

* cited by examiner

Primary Examiner—Lenard A. Footland
(74) Attorney, Agent, or Firm—Andrus, Sceales, Starke & Sawall, LLP

(57) ABSTRACT

A bearing system and journal which may incorporate either a sleeve or a ball bearing. The system includes a bearing journal having a sleeve bearing portion and a ball bearing portion. When a sleeve bearing is used in the system, a first end of the sleeve bearing is supported in the sleeve bearing portion of the journal, and a second end of the sleeve bearing is supported by a finger spring. The sleeve bearing and finger spring are retained within the journal by an end cap, which is press-fit into the ball bearing portion of the journal. When a ball bearing is used in the system, the ball bearing may be press-fit directly into the ball bearing portion of the bearing journal, or press-fit into a spacer, which is press-fit into the ball bearing portion of the bearing journal.

10 Claims, 6 Drawing Sheets

ND JOURNAL

ELECTRIC MOTOR BEARING SYSTEM AND JOURNAL

CROSS-REFERENCE TO RELATED APPLICATION

The present application is based on and claims priority from U.S. Provisional Application Serial No. 60/217,164, filed on Jul. 10, 2000.

FIELD OF THE INVENTION

The present invention relates in general to electric motors, and in particular to a bearing system and journal for the rotating output shaft of an electric motor.

BACKGROUND OF THE INVENTION

Conventional electric motors include a rotating output shaft for driving a mechanical device. The output shaft is typically supported by a bearing mounted within an end frame of the motor for providing the drive shaft with a thrust surface. Known bearings include, for example, sleeve-type bearings and ball bearings. Ball bearings are generally more robust than sleeve bearings, and, therefore, are typically used in larger, more expensive motors. Sleeve bearings, on the other hand may be used in smaller motors, or lower cost applications.

Prior art motor end frame designs accommodate only one bearing type, e.g., either a sleeve or ball bearing, but not both. This significantly limits the design flexibility relative to the types of bearings which may be used. Essentially, to use an alternative bearing, an entire new end frame must be provided for receiving and properly supporting the new bearing type. Obviously, this is inefficient, costly, and time consuming.

Another difficulty associated with prior art bearing systems relates to the manufacturing steps required for assembling the bearing to the end frame. Typically, a bearing, e.g., a sleeve bearing, is secured to the end frame using multiple parts, which may require permanent affixation, e.g., by welding. The multiple parts and manufacturing steps add to the manufacturing cost and, ultimately, to the end cost of a user.

Accordingly, there is a need in the art for an efficient and reliable bearing system which allows use of a sleeve or ball bearing in the same end frame. There is also need in the art for a sleeve bearing system which includes a minimized part count and which requires no fasteners during assembly.

SUMMARY OF THE INVENTION

Thus, the present invention is organized about the concept of providing a bearing system which may incorporate either a sleeve or a ball bearing, provides a minimized part count, and requires no fasteners for assembly, while providing for oil recirculation. The assembly includes a bearing journal having a sleeve bearing portion and a ball bearing portion. Where a sleeve bearing is used, a first end of the sleeve bearing is supported in the sleeve bearing portion of the journal, and a second end of the sleeve bearing may be supported by a finger spring. The sleeve bearing and finger spring are retained within the journal by an end cap which may be press-fit into the ball bearing portion of the journal. Where a ball bearing is used, the ball bearing may be press fit directly into the ball bearing portion of the bearing journal, or press fit into a spacer which is press fit into the ball bearing portion of the bearing journal.

More particularly, according to the invention there is provided a bearing journal including a sleeve bearing portion adapted for supporting a sleeve bearing and a ball bearing portion adapted for supporting a ball bearing. In one embodiment, the sleeve bearing portion is generally frusto-conical in shape and is defined by a sidewall and an end wall. An interior surface of the sidewall is adapted for contacting a first end of the sleeve bearing for supporting the sleeve bearing in the sleeve bearing portion. In another embodiment, the sleeve bearing portion is defined by a sidewall and an end wall, and a plurality of inwardly extending tabs are disposed on an interior surface of the side wall. The inwardly extending tabs are adapted for contacting a first end of the sleeve bearing for supporting the sleeve bearing in the sleeve bearing portion. Preferably, the sleeve bearing portion has an end wall and is adapted for supporting the sleeve bearing with a space between an end surface of the sleeve bearing and the end wall. The space may be filled with an oil medium for lubricating the bearing.

The ball bearing portion may be generally cylindrically shaped, and may be dimensioned to receive a ball bearing directly therein with a press-fit. Alternatively, the ball bearing portion may be dimensioned to receive a spacer directly therein with a press-fit. The ball bearing may be press-fit directly into the spacer.

In an embodiment of a bearing system according to the invention where a sleeve bearing is used with the bearing journal, the sleeve bearing may have a first end and a second end with the first end supported in the sleeve bearing portion of the journal. A finger spring may be disposed in the bearing journal for supporting the second end of the sleeve bearing. The finger spring may be generally annular having a radial flange and plurality fingers extending downwardly and radially inwardly from an inner edge of the radial flange. The second end of the sleeve bearing may be supported by the finger spring with the plurality of fingers in contact with the sleeve bearing. In another embodiment, the finger spring may be generally frusto-conical in shape having a radial flange, a frusto-conical sidewall extending from the flange, and an end wall. The second end of the sleeve bearing may be supported by the finger spring with the frusto-conical sidewall in contact with an exterior surface of the sleeve bearing, and the end wall in contact with an end surface of the sleeve bearing.

The exterior surface of the sleeve bearing may have oil recirculation channels disposed therein which provide space for an oil medium to travel between spaces adjacent to the first end of the sleeve bearing and the second end of the sleeve bearing.

An end cap may also be provided for securing the sleeve bearing and the finger spring in the bearing journal. The end cap may be press-fit into the bearing journal, e.g., with a first portion of the end cap in pressing engagement with an interior surface of the ball bearing portion. The end cap may be generally cylindrical in shape, and may have an end surface which contacts the finger spring to secure the finger spring and the sleeve bearing within the bearing journal.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

For a better understanding of the present invention, together with other objects, features and advantages, reference should be made to the following detailed description which should be read in conjunction with the following figures wherein like numerals represent like parts:

In the drawings:

FIG. 1 is a perspective partial-cutaway view of a motor assembly incorporating an exemplary bearing system in accordance with the invention;

FIG. 2 is an exploded view of a motor end frame incorporating another exemplary bearing system in accordance with the invention incorporating a sleeve bearing;

FIG. 3 is a sectional view taken along lines 3—3 of FIG. 2;

FIG. 4 is a bottom view of an exemplary finger spring portion of an exemplary bearing system in accordance with the invention;

FIG. 5 is a side view of the finger spring showing in FIG. 4;

FIG. 6 is a top view of an exemplary end cap portion of an exemplary bearing system in accordance with the invention;

FIG. 7 is a sectional view taken along lines 7—7 in FIG. 6;

FIG. 8 is an exploded view of a motor end frame incorporating an exemplary bearing system in accordance with the invention incorporating a ball bearing;

FIG. 9 is a sectional view taken along lines 9—9 of FIG. 8;

FIG. 10 is a sectional view of an exemplary bearing system in accordance with the invention wherein a ball bearing is press-fit directly into an exemplary bearing journal in accordance with the invention;

FIG. 11 is a bottom view of another exemplary bearing journal of a bearing system in accordance with the invention;

Figure 12:
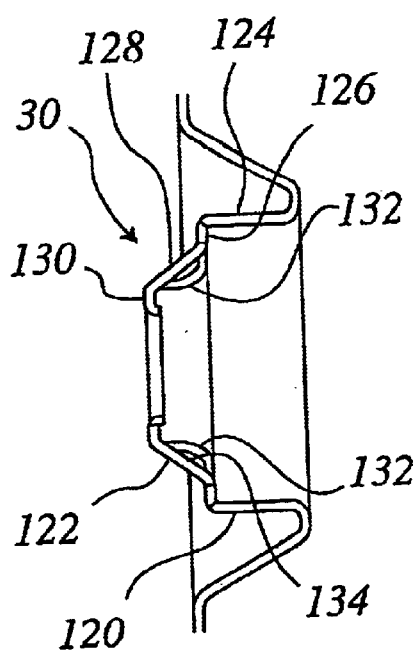
Figure 11:
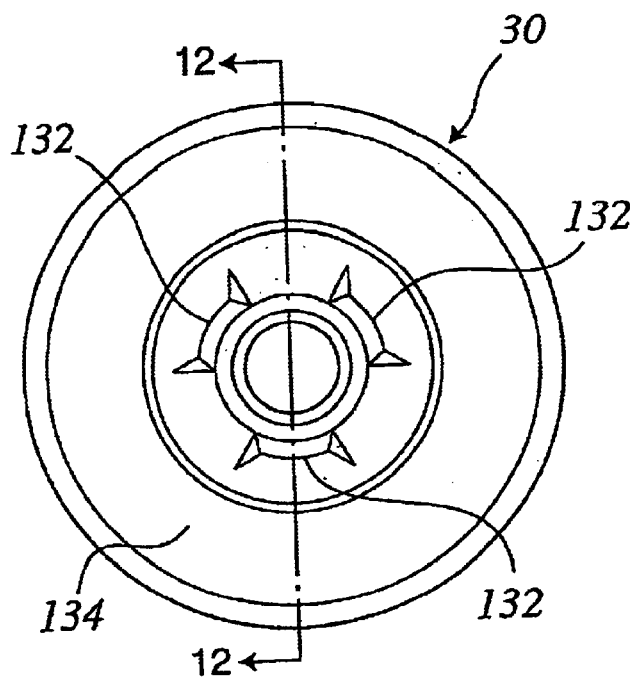
Figure 14:
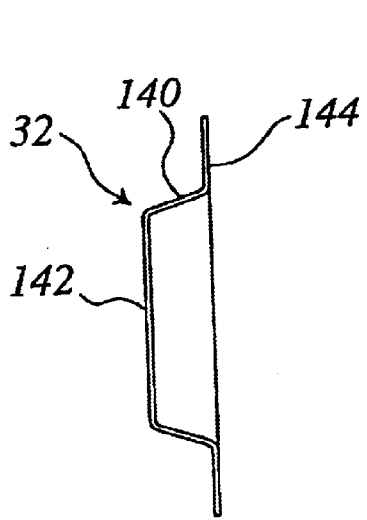
Figure 13:
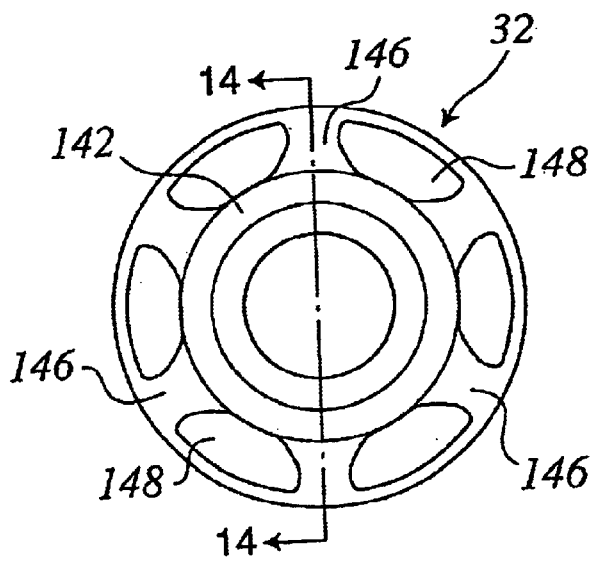

FIG. 12 is a sectional view taken along lines 12—12 in FIG. 11;

FIG. 13 is a bottom view of another exemplary finger spring portion of a bearing system in accordance with the invention; and FIG. 14 is a sectional view taken along lines 14—14 in FIG. 13.

Figure 15:
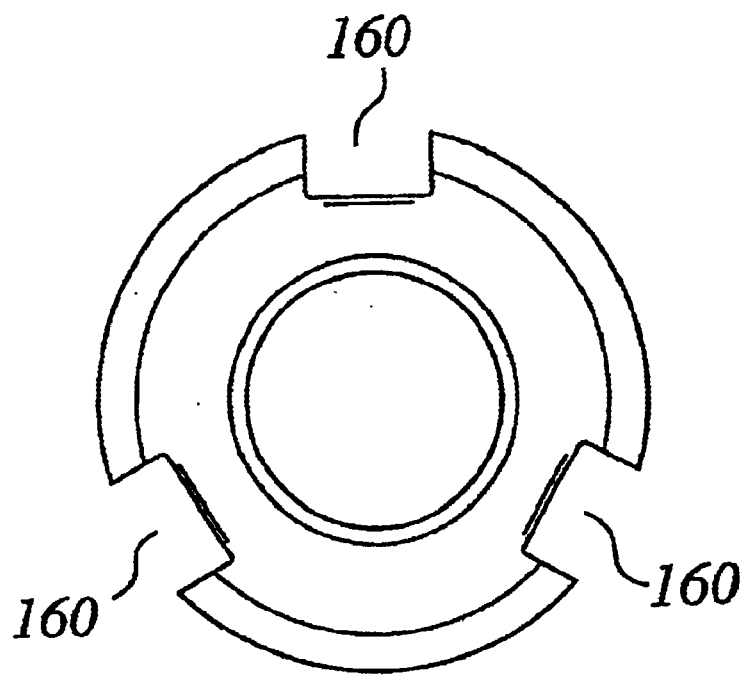

FIG. 15 is a front view of an exemplary sleeve bearing having recirculation channels according to the invention.

Figure 16:
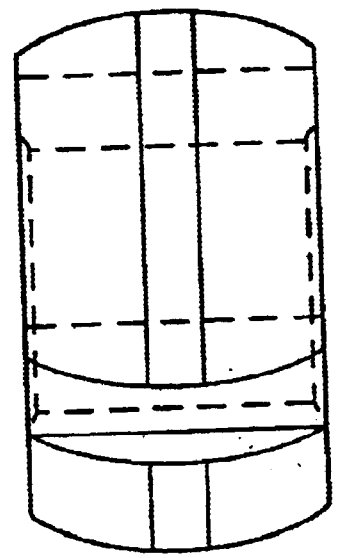

FIG. 16 is a partially sectioned side view of an exemplary sleeve bearing having recirculation channels according to the invention.

DETAILED DESCRIPTION OF THE INVENTION

Figure 1:
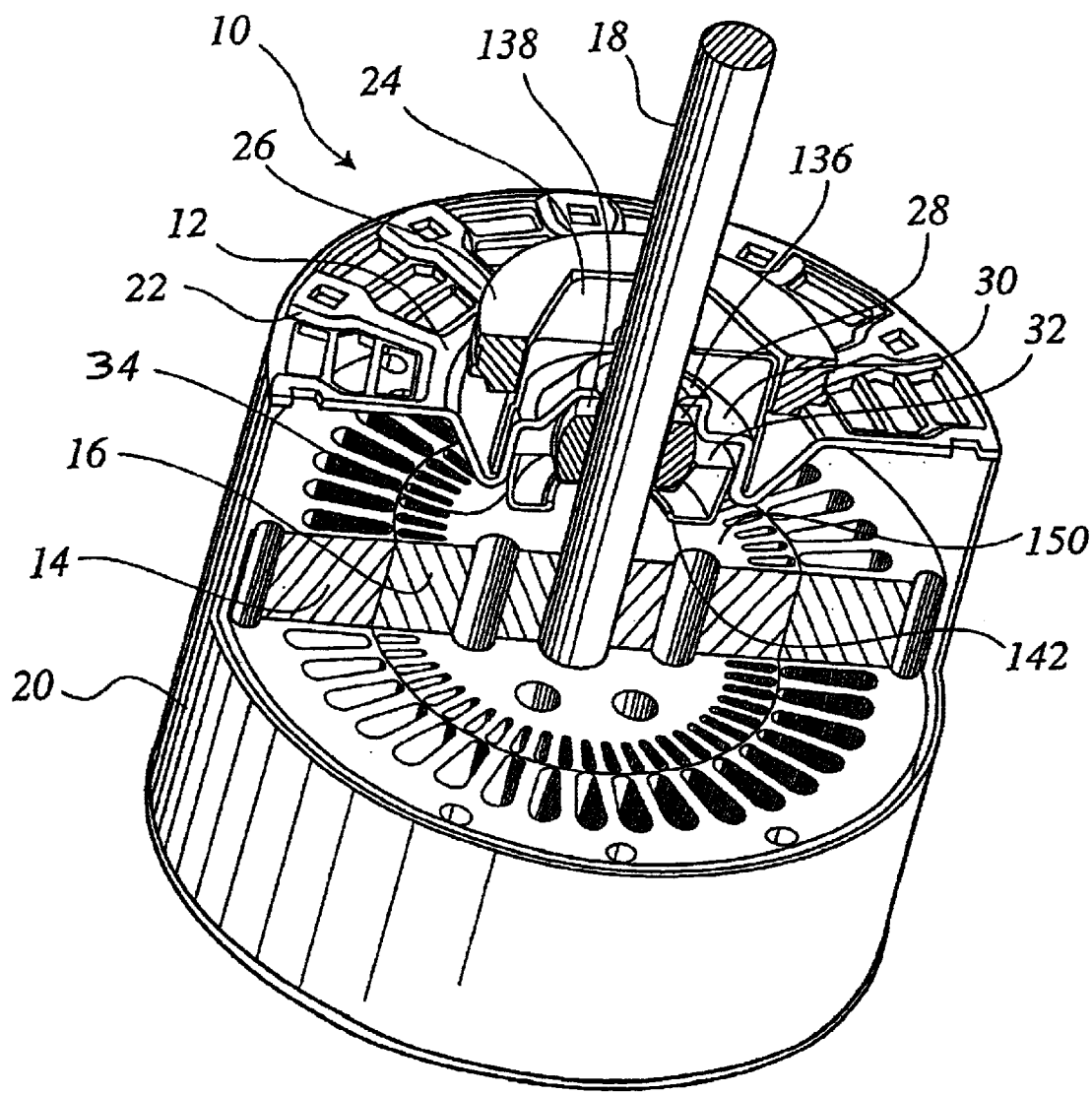

FIG. 1 illustrates an exemplary motor assembly 10 incorporating one embodiment of a bearing system 12 in accordance with the invention. As shown, the assembly may include a stator 14, a rotor 16, an output shaft 18, a housing 20 with an end frame 22, the bearing system 12, and an optional bearing journal cover 24 and gasket 26. Although the illustrated motor assembly is an AC motor assembly, those skilled in the art will recognize that a bearing system in accordance with the invention may be incorporated into a wide variety AC and DC motor assemblies, and is not limited to use in connection with the depicted assembly.

In the depicted embodiment, the bearing system 12 includes a bearing journal 30, a sleeve bearing 28, a finger spring 32, and an end cap 34. Generally, the bearing system 12 is incorporated into the end frame 22, and the output shaft 18 passes through each of the elements in the bearing system. The bearing 28 provides a bearing surface for the rotating motor output shaft during motor operation. As will become apparent from the description provided below, in accordance with the invention the sleeve bearing 28 may be replaced by a ball bearing which is press fit into the bearing journal 30, either directly or with an intermediate spacer, without the need for the finger spring or end cap. Advantageously, therefore, a bearing system in accordance with the present invention provides significant flexibility in the choice of bearing type. In addition, regardless of the type of bearing incorporated into the system, i.e., either a sleeve bearing or ball bearing, no mechanical fasteners are required during assembly of the bearing system.

Figure 2:
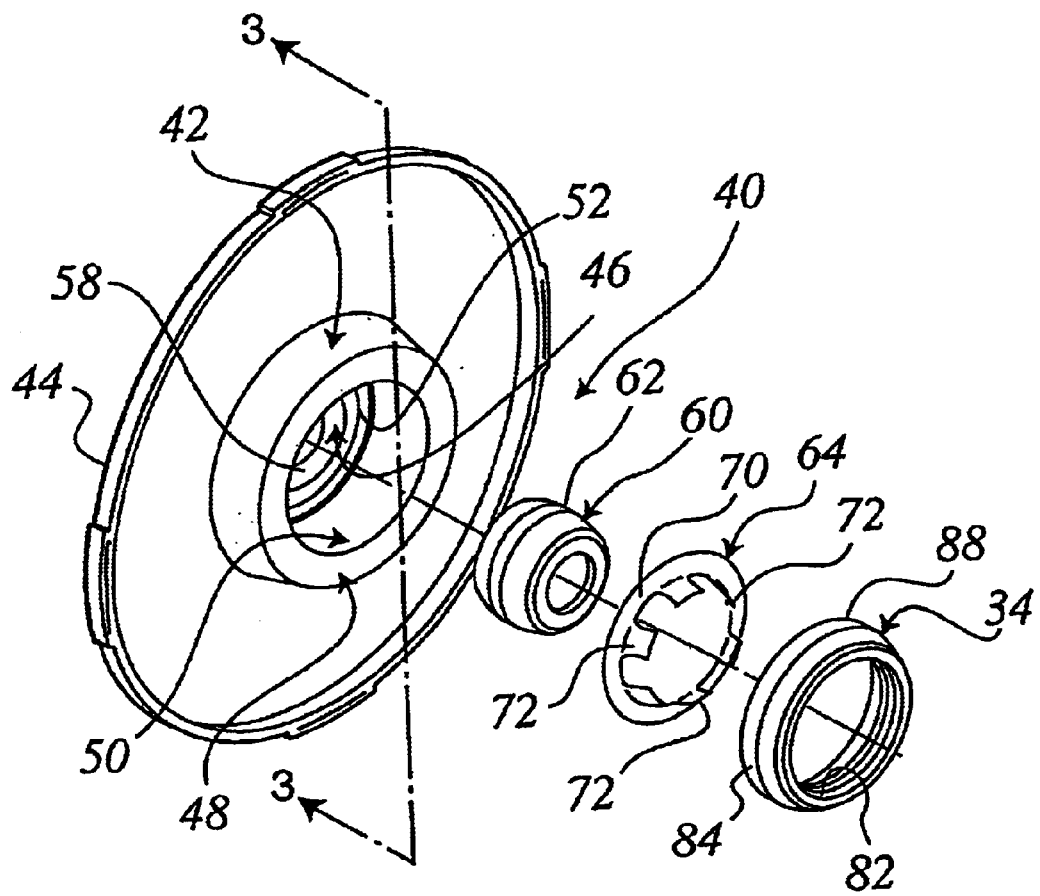
Figure 3:
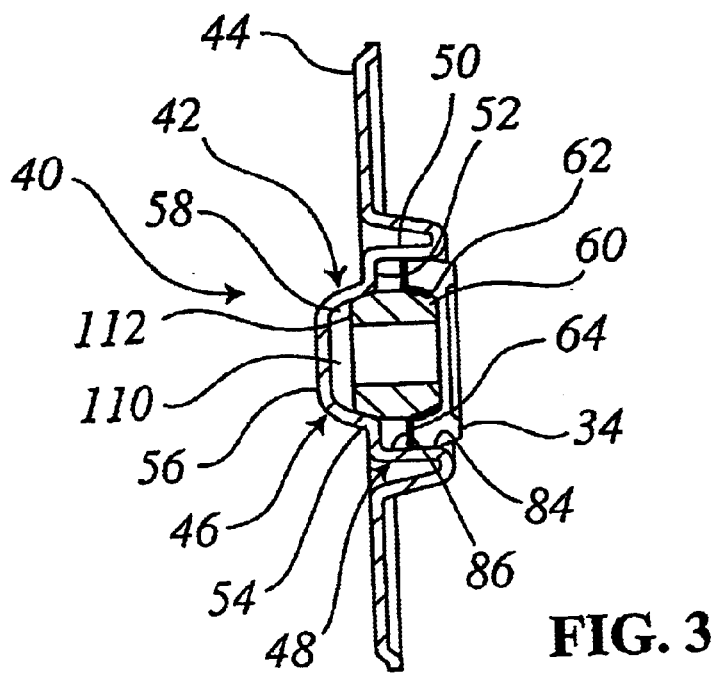

Turning now to FIGS. 2 and 3, there is shown another embodiment 40 of a bearing assembly according to the invention. In the illustrated embodiment, the bearing journal 42 is formed directly into the motor end frame 44. The bearing journal 42 includes a generally cylindrical ball bearing portion 48 and a generally frusto-concial sleeve bearing portion 46. The ball bearing portion 48 includes a generally cylindrical sidewall 50 and an end wall 52, and the sleeve bearing portion includes a generally frusto-concial sidewall 54 and an end wall 56. The curvature of the interior surface 58 of the generally frusto-conical side wall 54 is adapted to approximately correspond to the radius of curvature of a sleeve bearing 60 which may be incorporated into the assembly. As shown particularly in FIG. 3, where a sleeve bearing is used, the exterior surface 62 of the sleeve bearing uniformly engages the interior surface 58 of the generally frusto-conical sidewall.

Figure 4:
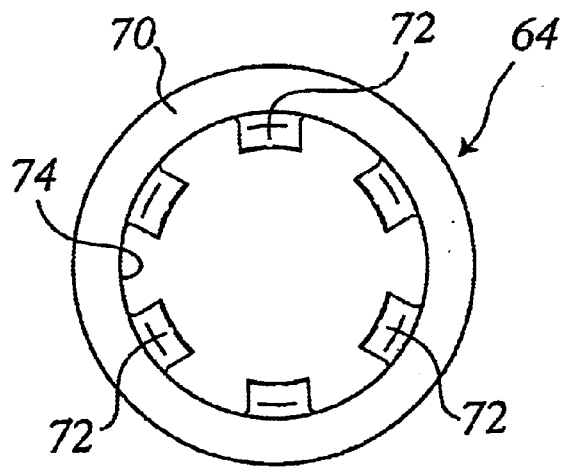
Figure 5:
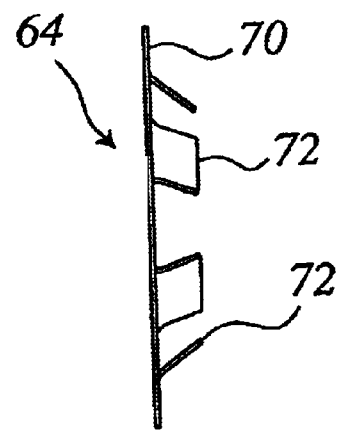

The sleeve bearing 60 is secured within the bearing journal by the finger spring 64 and the end cap 34. With reference also to FIGS. 4 and 5, the finger spring 64 is generally annular with a flange portion 70 at its perimeter and a plurality of equally spaced fingers 72 extending downward and radially inwardly from an inner edge 74 of the flange portion. The finger spring is sized so that the flange portion 70 fits between the interior surface 86 of the generally cylindrical sidewall 50 and the sleeve bearing 60 with the downwardly, and radially inwardly extending fingers 72 bearing against the exterior surface 62 of the sleeve bearing, as shown particularly in FIG. 3. Thus, the finger spring 64 supports the bearing against the interior surface 58 of the frusto-conical wall 54 in the sleeve bearing portion 46 of the bearing journal.

Figure 6:
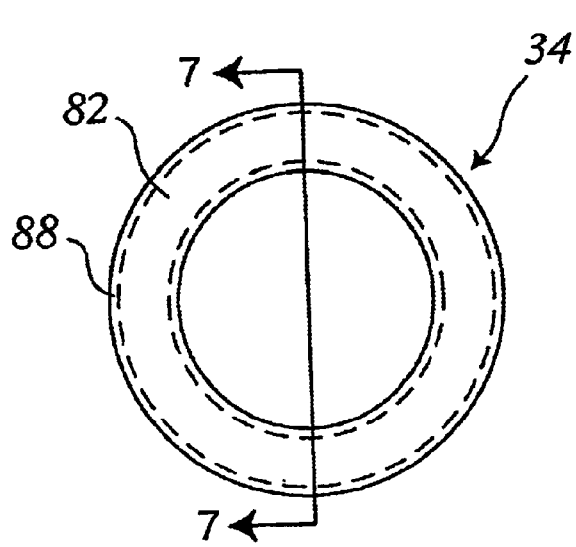
Figure 7:
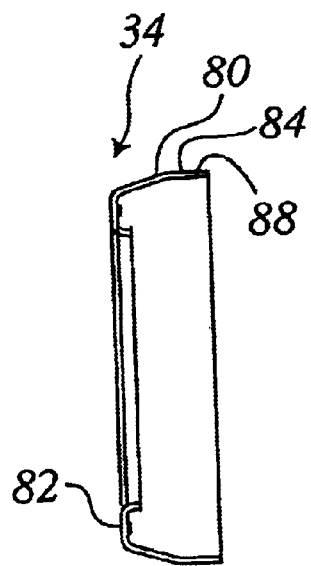

The finger spring 64 is retained in position by the end cap 34, one embodiment of which is shown more particularly in FIGS. 6 and 7. The end cap 34 has a generally cylindrical sidewall 80 and an end wall 82. The end cap is sized so that a first portion 84 of the sidewall may be press-fit into the ball bearing portion 48 of the bearing journal with an exterior surface of the first portion 84 pressingly engaging the interior surface 86 of the generally cylindrical sidewall 50. As the end cap is press-fit into the bearing journal, the end surface 88 of the end cap pressingly engages the flange 70 on the finger spring 64, thereby forcing the finger spring 70 into the bearing journal 40 and forcing engagement of the downwardly extending fingers 72 with the exterior surface of the bearing 62, as shown for example in FIG. 3.

Thus, the bearing 60 is secured within the bearing journal by the combination of the finger spring 64 and the end cap 34. Advantageously, the end cap is simply press fit into the bearing journal to secure the finger spring in position. No fasteners are required for assembling the bearing system, thereby allowing significant manufacturing efficiency.

Figure 8:
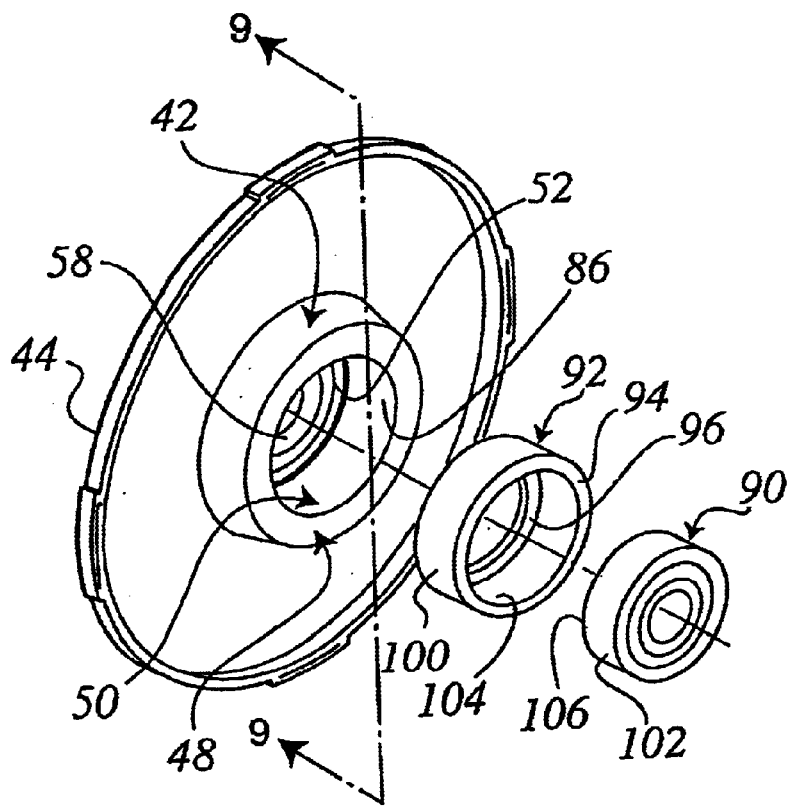
Figure 9:
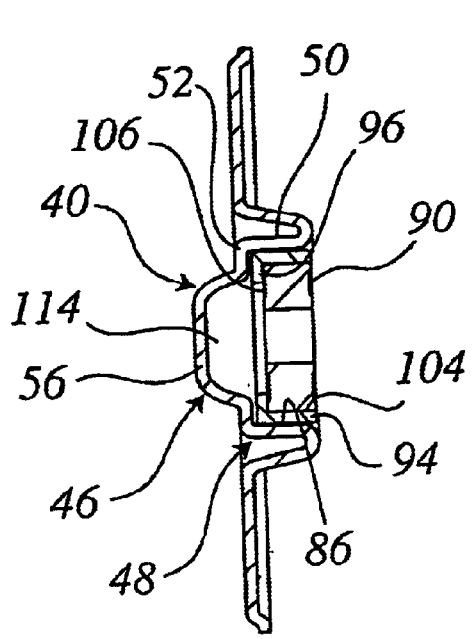

Turning now to FIGS. 8 and 9, another significant advantage of a bearing system in accordance with the present invention is that a ball bearing 90 may be substituted for the sleeve bearing shown in FIG. 3. In the illustrated embodiment, the same bearing journal 40 used in the sleeve bearing embodiment is used, but the finger spring 64 and the end cap 34 are no longer necessary. As shown, the generally cylindrical wall 50 of the ball bearing portion 48 of the bearing journal may be sized to receive a generally cylindrical spacer 92 having a sidewall 94 and an end wall 96. The spacer may be press-fit into the ball bearing portion 48 with the exterior surface 100 of the side wall 94 pressingly engaging the interior surface 86 of the generally cylindrical wall of the bearing journal, and the end wall 96 pressingly abutting the end wall 52 of the ball bearing portion 48, as shown particularly in FIG. 9. The ball bearing 90 may then be press fit into the spacer 92 with the exterior surface 102 of the ball bearing 90 pressingly engaging the interior surface 104 of the spacer side wall 94, and the end surface 106 of the ball bearing abutting the end wall 96 of the spacer.

Figure 10:
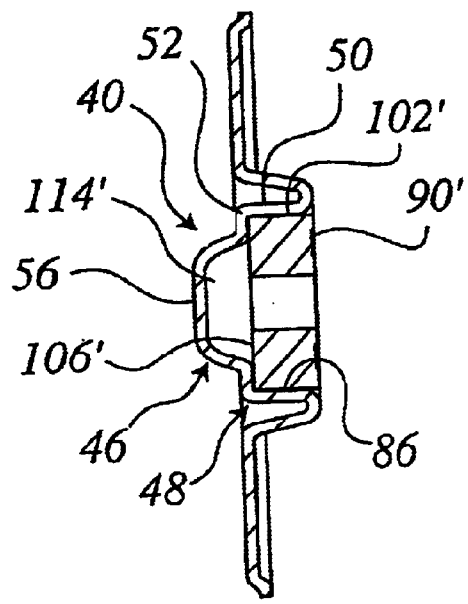

The primary function of the spacer in the depicted embodiment is to appropriately size the opening to the ball bearing portion 48 for receiving a ball bearing having a specific outside diameter. Thus, the thickness of the spacer sidewall 94 can be adjusted to accommodate varying ball bearing outside diameter dimensions. In fact, in one embodiment, as shown in FIG. 10, the spacer 94 may be completely omitted from the bearing system, and the bearing 90' may be press fit directly into the ball bearing portion 48 of the bearing journal with the outside surface 102' of the bearing pressingly engaging the interior surface 86 of the generally cylindrical wall 50 of the bearing journal, and the end surface 106' of the bearing abutting the end wall 52 of the ball bearing portion.

Again, in the ball bearing embodiment of a bearing system according to the invention, no fasteners are required for assembly. Another advantage of a bearing system in accordance with the invention is that oil recirculation is allowed in either the sleeve bearing or ball bearing embodiment. Where the sleeve bearing is used, e.g., as shown in FIG. 3, a space 110 is defined between the end surface 112 of the sleeve bearing 60 and the end wall 56 of the sleeve bearing portion 46 of the bearing journal. Likewise, in a ball bearing embodiment, e.g., as shown in FIGS. 9–11, a space 114 or 114' is formed between the end surface of the ball bearing 106 or 106' and the end wall 56 of the sleeve bearing portion.

In either embodiment, an oil medium (not shown), such as permawick, may be disposed within the space 100, 114, or 114' for lubricating the bearing system during operation. In the sleeve bearing embodiment, due to the open structure of the finger spring 64 and the end cap 34, oil may be recirculated through the system by a slinger (not shown) on the output shaft 18 of the motor assembly. Thus, oil recirculation is achieved in a bearing system which requires no fasteners, and which may accommodate either a sleeve bearing or a ball bearing. In one embodiment of the invention using a sleeve bearing, an outer surface of the bearing may have recirculation channels 160 as illustrated in FIGS. 15–16 disposed into the sidewalls to provide space for an oil medium.

Turning now to FIGS. 11–14, the exemplary embodiment 22 of the bearing system illustrated in FIG. 1 will now be described in further detail. As shown particularly in FIGS. 11 and 12, the exemplary bearing journal 30 includes a generally cylindrical ball bearing portion 120 and a generally frusto-conical sleeve bearing portion 122. The ball bearing portion 120 includes a generally cylindrical sidewall 124 and an end wall 126, and the sleeve bearing portion includes a generally frusto-conical sidewall 128 and an end wall 130. As described above, the ball bearing portion 120 is dimensioned to receive by press-fit either a ball bearing directly, or a spacer which is dimensioned to receive a ball bearing.

In the illustrated embodiment, however, a plurality of inwardly extending tabs 132 are disposed on the interior surface 134 of the frusto-conical side wall 128 for supporting a sleeve bearing 28. The dimension between the tabs 132 is adapted to approximately correspond to the outside dimension of the sleeve bearing 28, whereby the sleeve bearing is supported by the tabs 132 in the sleeve bearing portion 122. Thus, the shape or dimension of the generally frusto-conical wall 128 can vary since it is not used to support the bearing in the embodiment illustrated in FIG. 1. A space 136 (FIG. 1) is, however, maintained between the end wall 130 of the sleeve bearing portion and the end 138 of the sleeve bearing for receiving oil medium. FIGS. 13 and 14 depict the alternative finger spring 32 shown in FIG. 1. The alternative finger spring is generally frusto-conical with a sidewall 140, an end wall 142, and a radial flange 144. The sidewall may be defined by a plurality of fingers 146 extending from the flange 144 to the end wall, thereby defining openings 148 between the fingers, which allow for oil recirculation. The finger spring 32 supports the bearing against the tabs 132 with the sidewall 140 engaging the exterior surface of the sleeve bearing 28 and the end wall 142 positioned against the end surface 150 of the sleeve bearing. Again, the finger spring and the sleeve bearing are held in place by the end cap 34 which may be press fit into the ball bearing portion of the bearing journal, as described above.

There is thus provided a bearing system, which may incorporate either a sleeve or a ball bearing. The system provides a minimized part count and requires no fasteners for assembly, while providing for oil recirculation. The assembly includes a bearing journal having a sleeve bearing portion and a ball bearing portion. Where a sleeve bearing is used, a first end of the sleeve bearing is supported in the sleeve bearing portion of the journal, and a second end of the sleeve bearing is supported by a finger spring. The sleeve bearing and finger spring are retained within the journal by an end cap, which is press-fit into the ball bearing portion of the journal. Where a ball bearing is used, the ball bearing may be press fit directly into the ball bearing portion of the bearing journal, or press fit into a spacer which is press fit into the ball bearing portion of the bearing journal.

The embodiments which have been described herein, however, are but some of several which utilize this invention and are set forth here by way of illustration but not of limitation. It is obvious that many other embodiments, which will be readily apparent to those skilled in the art, may be made without departing materially from the spirit and scope of the invention as defined in the appended claims.

Various alternatives and embodiments are contemplated as being within the scope of the following claims particularly pointing out and distinctly claiming the subject matter regarded as the invention.

We claim:

1. A bearing system for an output shaft of a motor assembly comprising;

a bearing journal having a sleeve bearing portion and a ball bearing portion for alternatively receiving and supporting both a sleeve bearing and a ball bearing, the sleeve bearing portion being defined by a sidewall and an end wall, the ball bearing portion being defined by a cylindrical outer wall connected to and spaced radially outward from the sleeve bearing portion sidewall by a second end wall;

a sleeve bearing for supporting the output shaft, said sleeve bearing having a first end and a second end, said first end being supported in said sleeve bearing portion of said bearing journal;

a finger spring disposed in said ball bearing portion of the bearing journal and supporting said second end of said sleeve bearing; and an end cap press-fit into said ball bearing portion of the bearing journal for securing said sleeve bearing and said finger spring in said bearing journal.

2. A bearing system according to claim 1, wherein said first end of said sleeve bearing being supported in said sleeve bearing portion by contact of said sleeve bearing with an interior surface of said sleeve bearing portion sidewall.

3. A bearing system according to claim 1, wherein said finger spring is generally annular having a radial flange and plurality fingers extending downwardly and radially inwardly from an inner edge of said radial flange, said second end of said sleeve bearing being supported by said finger spring with said plurality of fingers in contact with said sleeve bearing.

4. A bearing system according to claim 1, wherein said end cap is generally cylindrical in shape, and wherein an end surface of said end cap contacts said finger spring to secure said finger spring and said sleeve bearing within the ball bearing portion of said bearing journal.

5. A bearing system according to claim 4, wherein said end cap is press-fit into said bearing journal with a first portion of said end cap in pressing engagement with an interior surface of the cylindrical outer wall of the ball bearing portion.

6. A bearing system according to claim 1, wherein said ball bearing portion is dimensioned to receive a ball bearing directly therein with a press-fit.

7. A bearing journal formed as part of a motor end frame of a motor assembly comprising:

a sleeve bearing portion adapted for supporting a sleeve bearing, the sleeve bearing portion being defined by a sidewall and an end wall, wherein an interior surface of said sidewall is adapted for contacting a first end of the sleeve bearing for supporting the sleeve bearing in the sleeve bearing portion; and a ball bearing portion adapted for supporting a ball bearing, the ball bearing portion being defined by a cylindrical outer wall connected to and spaced radially outward from the sleeve bearing portion sidewall by a second end wall, wherein the bearing journal is configured for alternatively receiving and supporting both the sleeve bearing and the ball bearing.

8. A bearing journal according to claim 7, wherein said sleeve bearing portion is adapted for supporting said sleeve bearing with a space between an end surface of said sleeve bearing and said end wall.

9. A bearing journal according to claim 7, wherein said ball bearing portion is dimensioned to receive a ball bearing directly therein with a press-fit.

10. A bearing journal according to claim 7, wherein said ball bearing portion is dimensioned to receive a spacer directly therein with a press-fit, said spacer being dimensioned to receive a ball bearing directly therein with a press-fit.

* * * * *